United States Patent [19]
Hughes et al.

[11] Patent Number: 5,533,259
[45] Date of Patent: Jul. 9, 1996

[54] METHOD OF MAKING AN EVAPORATOR OR EVAPORATOR/CONDENSER

[75] Inventors: Gregory G. Hughes, Milwaukee; Leon A. Guntly, Racine, both of Wis.; John B. Welker, Granger, Ind.; David T. Hill; Jerome P. Henkes, both of Racine, Wis.; Michael J. Reinke, Franklin; C. James Rogers, Racine, both of Wis.

[73] Assignee: Modine Manufacturing Co., Racine, Wis.

[21] Appl. No.: 131,665

[22] Filed: Oct. 5, 1993

Related U.S. Application Data

[60] Division of Ser. No. 850,338, Mar. 11, 1992, Pat. No. 5,251,965, which is a continuation-in-part of Ser. No. 620,729, Dec. 3, 1990, which is a division of Ser. No. 141,628, Jan. 7, 1988, Pat. No. 4,998,580, which is a continuation-in-part of Ser. No. 902,567, Sep. 5, 1986, which is a continuation-in-part of Ser. No. 783,087, Oct. 2, 1985, abandoned.

[51] Int. Cl.$^6$ .................................................. B23P 15/26
[52] U.S. Cl. .................. 29/890.043; 29/890.046; 29/890.07

[58] Field of Search ............... 29/890.046, 890.035, 29/890.043, 890.07, 469; 165/133

[56] References Cited

U.S. PATENT DOCUMENTS

| | | | |
|---|---|---|---|
| 4,805,693 | 2/1989 | Flessate | 29/890.049 |
| 4,876,778 | 10/1989 | Hagihara et al. | 29/890.046 |
| 4,932,469 | 6/1990 | Beatenbough | 29/890.07 |
| 5,228,197 | 7/1993 | Cox et al. | 29/890.046 |

*Primary Examiner*—Irene Cuda
*Attorney, Agent, or Firm*—Wood, Phillips, VanSanten, Clark & Mortimer

[57] ABSTRACT

An improved evaporator or evaporator/condenser for use in refrigeration or heat pump systems including first and second spaced, pressure resistant headers (10, 12); a plurality of elongated tubes (20) of flattened cross-section extending in parallel, spaced relation between and in fluid communication with the headers (10, 12) and serpentine fins (34) extending between and bonded to adjacent ones of the tubes (20). The tubes (20) and fins (34), between the headers (10, 12), define a non-planar configuration having an apex (80). A condensate trough (82) is aligned with and opens towards the apex (80) to receive condensate dripping therefrom.

18 Claims, 4 Drawing Sheets

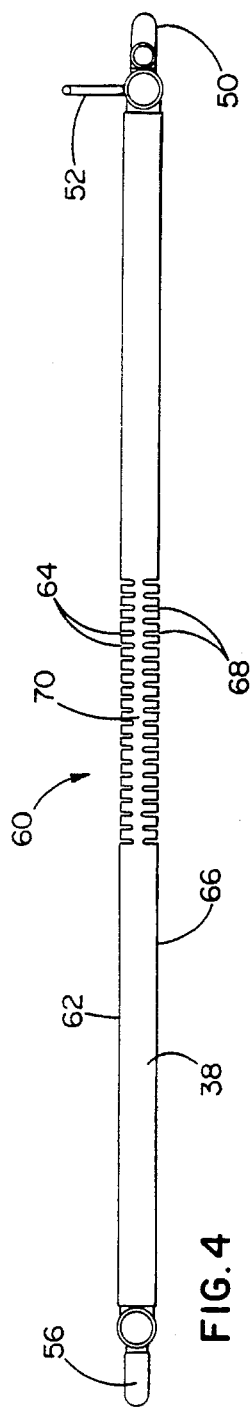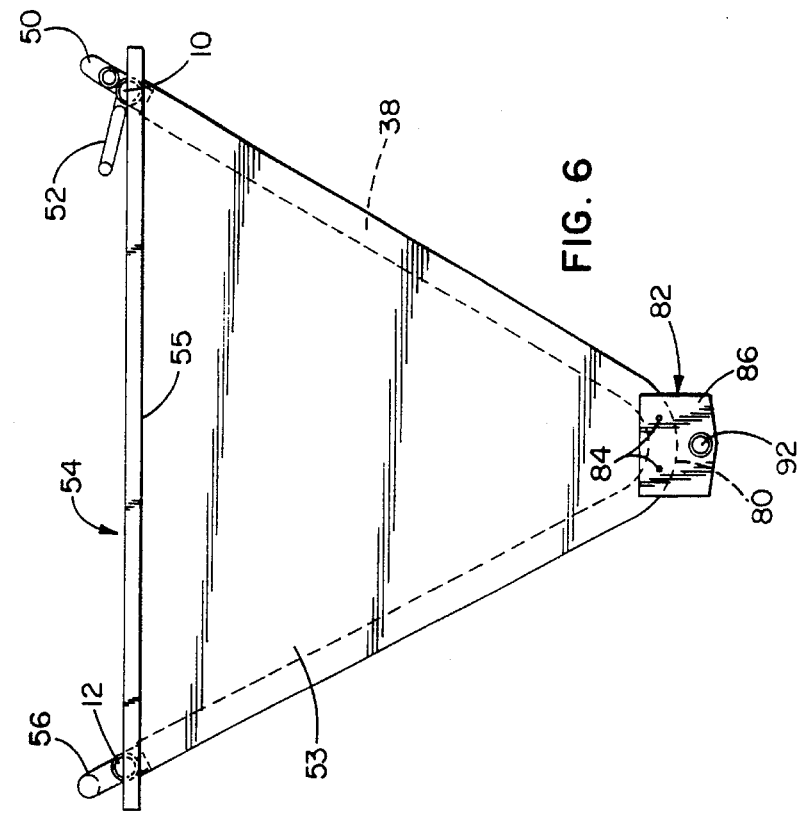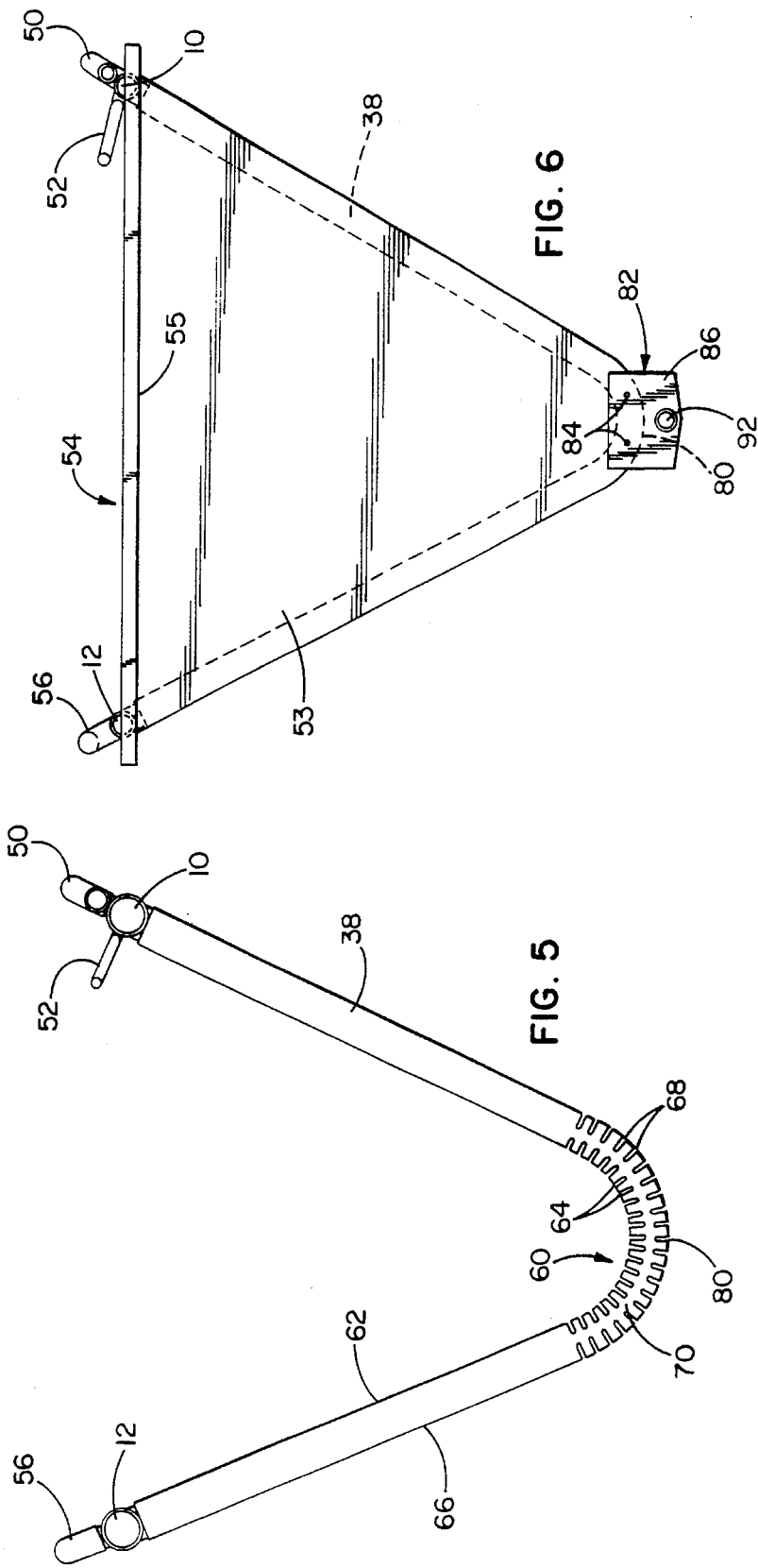

METHOD OF MAKING AN EVAPORATOR OR EVAPORATOR/CONDENSER

CROSS-REFERENCE

This is a division of application Ser. No. 850,338 filed Mar. 11, 1992, now U.S. Pat. No. 5,251,965, which is a continuation-in-part of commonly assigned, application Ser. No. 620,729 filed Dec. 3, 1990 which in turn is a division of commonly assigned Ser. No. 141,628 filed Jan. 7, 1988, now U.S. Pat. No. 4,998,580, which in turn is a continuation-in-part of commonly assigned Ser. No. 902,567 filed Sep. 5, 1986 which, in turn, is a continuation-in-part of commonly assigned application Ser. No. 783,087 filed Oct. 2, 1985, abandoned.

FIELD OF THE INVENTION

This invention relates to two phase heat exchangers, and more particularly, to two phase heat exchangers such as are used in air-conditioning or refrigeration systems or heat pumps.

BACKGROUND OF THE INVENTION

In vapor compression, air-conditioning or heat pump systems, a heat exchanger is disposed in some sort of an air handling device as a plenum associated with a blower. In the case of air-conditioning systems, most usually, but not always, the plenum is the hot air plenum of a furnace.

In any event, in both air-conditioning systems and in heat pump systems, for cooling purposes this heat exchanger is employed as an evaporator to evaporate a working fluid for the purpose of absorbing heat from ambient air driven through the heat exchanger by the blower associated with the plenum. In the case of a heat pump, this heat exchanger, for heating purposes, will also serve as a condenser for the working fluid which gives up heat to the ambient air upon condensing within the heat exchanger.

Most frequently, these heat exchangers are in the form of so-called A-coil evaporators. In the usual case, an A-coil evaporator is in actuality formed of two essentially separate heat exchangers that are inclined upwardly toward each other. Each heat exchanger is made up of a plurality of plate fins disposed in parallel and in vertical planes through which horizontally oriented, round tubes pass. The ends of the round tubes emerging at each end of the bundle of plate fins are connected by U-tubes. A double trough which is in effect a trough with an open center mounts the two heat exchangers with the trough on each side of the central opening receiving condensate from an associated one of the two heat exchangers. The air to be cooled or heated passes up the open center of the trough and through the plate fins in an upward and diagonally outward direction within the plenum.

While A-coil evaporators have worked well for their intended purpose, they are not without a number of drawbacks. For one, in many instances when operating as evaporators, condensate condensing on the plate fins does not drain well and may bridge the gap between adjacent fins.

The resulting water bridge impedes air flow through the heat exchanger which in turn reduces heat transfer from the air. Fin and tube temperature may drop such that the water bridging the fins begins to freeze. As a consequence, drainage is increasingly impeded and the entire heat exchanger may ultimately freeze up.

While this difficulty may be solved by employing a greater air flow, that results in increased capital expense in terms of a larger motor and/or blower as well as increased operating costs.

Furthermore, manifolding the two heat exchangers together into an A-coil heat exchanger requires the performance of a significant number of purely manual operations, thus increasing manufacturing costs. In addition, because each tube has two soldered or brazed joints, one at each end, there is a relatively large potential for refrigerant leakage where a large number of tubes are employed. Conventional A-coils are also heavy and frequently difficult to handle during installation as a result. They are also easily damaged.

In many instances, proper distribution of the refrigerant through the heat exchanger when used as an evaporator may require fairly complex plumbing and/or a complex distribution system to achieve a desired degree of temperature uniformity of exiting air across the heat exchanger.

Moreover, when a heat exchanger is employed in a heat pump system, and thus must function as both an evaporator and a condenser, efficiencies are of substantial concern. Two phase heat exchange operations as when one heat exchange fluid is transitioning from the liquid phase to the vapor phase or vice versa are nowhere near as well understood as single phase heat exchange operations. Furthermore, in differing two phase heat exchange operations, what may be of concern in one is not of concern in the other. For example, in the two phase heat exchange operation of evaporation within a refrigeration system, provision must be made to dispose of condensate resulting from moisture in ambient air being passed through the heat exchanger condensing on the cool surfaces thereof. There is no corresponding air side problem in the two phase operation of condensation. However, in the two phase operation of condensation on the refrigerant side, gravitational effects may dictate the orientation of various passages because it is difficult to cause condensate to flow uphill when mixed with substantially less dense vapor. In heat exchangers operating as evaporators, orientation for gravitational purposes may not be as critical.

On the other hand, if incoming refrigerant in a heat exchanger operating as an evaporator is not uniformly distributed, substantial temperature differentials in air exiting different parts of the evaporator may occur and heat exchange efficiency suffers. Distribution of incoming vapor is not, however, a great concern in a heat exchanger operating as a condenser.

Consequently, there is not only a real need for a new and improved evaporator, there is also a need for a heat exchanger that can alternatively function with great efficiency as both an evaporator and as a condenser so as to be especially adapted for use in a heat pump system.

SUMMARY OF THE INVENTION

It is a principal object of the invention to provide a new and improved evaporator or evaporator/condenser for use in a refrigeration or heat pump system. More specifically, it is an object of the invention to provide such an evaporator or evaporator/condenser that is relatively inexpensive to manufacture, that is relatively lightweight and not susceptible to damage; that provides excellent drainage of condensate when operating as an evaporator; which requires a small condensate collection trough and which requires a reduced charge of refrigerant over conventional A-coil evaporators or evaporator/condensers.

It is also a principal object of the invention to provide a method of manufacturing such an evaporator or evaporator/condenser.

An exemplary embodiment of the invention achieves one of the foregoing objects in an evaporator or evaporator/condenser construction including first and second, spaced, pressure resistant headers. A plurality of elongated tubes of flattened cross-section extend in parallel, spaced relation between and in fluid communication with the headers. Serpentine fins extend between and are bonded to adjacent one pair of the tubes. The tubes and the fins, between the headers, are configured to define a non-planar configuration having an apex.

In a preferred embodiment, the headers define a plane and the apex extends downwardly away from the plane, to thereby provide a U or V-shaped configuration.

A preferred embodiment contemplates the provision of a condensate trough aligned with and below the apex and mounted thereto.

In a highly preferred embodiment, the tubes are formed of extruded aluminum and include plural internal webs dividing each tube into plural flow passages of relatively small hydraulic diameter.

It is also highly preferred, particularly when the device is an evaporator/condenser, that the hydraulic diameter be 0.070 inches or less. Even more preferably, the hydraulic diameter is 0.040 inches or less.

The invention contemplates that the tubes have major and minor dimensions and that the apex is defined by bends in the tubes resulting from bending forces applied across the major dimensions of the tubes.

Typically, the tubes and fins define a core. The invention contemplates that side pieces be located on opposed sides of the core and extend between the headers. The side pieces are elongated and include accordion formations intermediate their ends to facilitate the formation of the apex. In a highly preferred embodiment, the accordion formations include slots extending transversely partially across the respective side pieces in the vicinity of the apex. In a highly preferred embodiment, each side piece includes opposed edges and the slots are located in both of the edges with the slot in one edge being staggered with respect to the slots in the other edge.

The invention also includes the provision of a baffle in at least one of the headers intermediate the ends thereof to thereby define a multiple pass evaporator or evaporator/condenser. In a highly preferred embodiment, there is but a single baffle in one of the headers at the approximate mid-point thereof so that there are two passes of approximately equal flow area.

The invention also contemplates the provision of a multiple tube row evaporator or evaporator/condenser. This aspect of the invention is defined by a nested configuration of at least two of the evaporators or evaporator/condensers described previously which are secured together.

In one embodiment of the invention, the multiple tube row evaporator or evaporator/condenser has the tubes in adjacent rows aligned with one another. In another embodiment, the tubes in adjacent rows are staggered with respect to each other.

In a highly preferred embodiment, the serpentine fins and the tubes are formed of aluminum. Preferably, there are at least about twenty fins per inch.

According to another aspect of the invention, there is provided a method of making an evaporator or evaporator/condenser which includes the steps of: a) assembling parallel flattened tubes to spaced parallel headers with serpentine fins between the tubes; b) subjecting the assemblage resulting from step a) to a bonding process to unite the headers, the tubes and the fins into a unitary assembly; and, c) thereafter bending the unitary assembly between the headers into a U or V-shaped configuration.

Preferably, the fins, the tubes and the headers are aluminum and the bonding process of step b) is a brazing process.

The invention contemplates that the bending step be followed by the step of adding side panels and attaching a trough to the unitary assembly so as to align with and open toward the bottom of the U or V-shaped configuration and thus act as a condensate collection trough.

The invention further contemplates that step a) include the application of side pieces to opposed sides of the assemblage so as to flank the same and extend between the headers and that the side pieces are provided with accordion formations intermediate their ends.

In one embodiment of the invention, steps a), b) and c) mentioned previously are repeated to provide at least two U or V-shaped configurations and are followed by the step of d) nesting the U or V-shaped configurations in a stack to provide a multiple row evaporator or evaporator/condenser.

This embodiment of the invention further contemplates the additional step of e) attaching a trough to the evaporator or evaporator/condenser below the lower most U or V-shaped configuration in alignment with the bottom thereof and opening toward the U or V-shaped configuration.

In this embodiment of the invention, one form contemplates that the step of nesting include aligning the tubes in adjacent U or V-shaped configurations while another form of the invention contemplates that the nesting step include staggering the tubes in adjacent U or V-shaped configurations.

The method of the invention also contemplates a step of forming a baffle in one of the headers intermediate the ends thereof to thereby provide a multiple pass evaporator or evaporator/condenser.

Other objects and advantages will become apparent from the following specification taken in connection with the accompanying drawings.

DESCRIPTION OF THE DRAWINGS

FIG. 4 is a side elevation of the evaporator or evaporator/condenser at the same stage of manufacture as illustrated in FIG. 3;

FIG. 5 is a view similar to FIG. 4, but showing the evaporator or evaporator/condenser at a subsequent stage in the manufacture thereof;

FIG. 6 is a side elevation of a finished evaporator/condenser;

DESCRIPTION OF THE PREFERRED EMBODIMENTS

Figure 1:
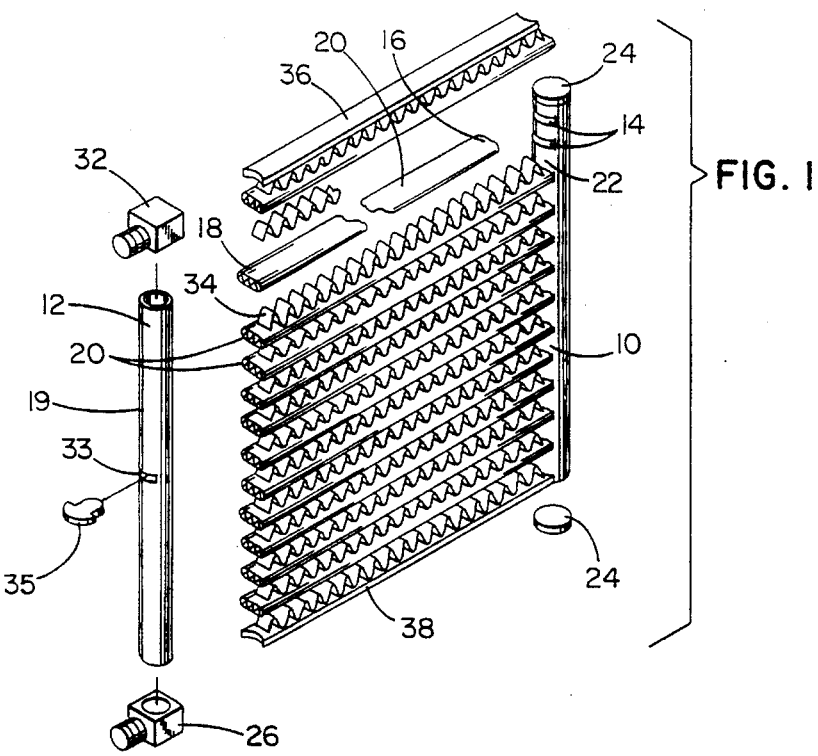
FIG. 1 is an exploded view of a heat exchanger of the so-called parallel flow type and illustrating a number of the important components of an evaporator or evaporator/condenser made according to the invention.

A heat exchanger of the parallel flow type is illustrated in FIG. 1. It is to be understood that FIG. 1 does not illustrate a finished evaporator or evaporator/condenser made according to the invention, but does illustrate a heat exchanger having a very high degree of identity with the evaporator or evaporator/condenser of the invention. It is included more by way of providing ready reference and explanation for the description of actual embodiments made according to the invention than for any other purpose.

As seen in FIG. 1, the heat exchanger includes opposed, spaced, generally parallel headers 10 and 12. The headers 10 and 12 are preferably made up from generally cylindrical, aluminum tubing having aluminum braze cladding on its exterior surface. On their facing sides, they are provided with a series of generally parallel slots or openings 14 for the receipt of corresponding ends 16 and 18 of flattened tubes 20. The tubes 20 are preferably formed of aluminum extrusions as will be described in greater detail in connection with FIG. 2 herein.

The header tubes 10 and 12 are preferably welded and thus include a weld seam shown at 19 on the header 12. The slots 14 are punched in the sides of the headers 10 and 12.

Preferably, between the slots 14, in the area shown at 22, each of the headers 10 and 12 is provided with somewhat spherical domes to improve resistance to high pressure as more fully disclosed in commonly assigned Saperstein, et al. U.S. Pat. No. 4,615,385, the details of which are herein incorporated by reference.

The header 10 has opposite ends closed by caps 24 brazed or welded thereto. In the preferred embodiment of the invention, the various components are all brazed together and accordingly, in the usual case, brazing will be the means employed to fasten the caps 24 to the header 10. Similarly, fittings such as a vapor inlet/outlet fitting 26 may be brazed to one end of the header 12 while a liquid inlet/outlet fitting 32 may be brazed to the opposite end thereof. Because inlet and outlet flow must be separated, the header 12 is slotted intermediate its ends as at 33, and specifically, at its midpoint to receive a baffle 35. According to the invention, the slot 33 and baffle 35 are formed according to commonly assigned U.S. Pat. No. 4,936,381 to Alley, the details of which are herein incorporated by reference.

As can be readily seen in FIG. 1, a plurality of the tubes 20 extend between the headers 10 and 12 in parallel relationship and in fluid communication with the interior of the headers 10 and 12. The tubes 20 on one side of the baffle 35 are thus hydraulically in parallel with one another while the tubes on the opposite side of the baffle 35 are in hydraulic parallel with one another, but in series with the first group of tubes, thus forming a two pass heat exchanger.

Disposed between adjacent ones of the tubes 20 are louvered serpentine fins 34 of braze clad aluminum. According to the invention, there are preferably at least twenty and as many as twenty-six fins per inch. Upper and lower aluminum side pieces 36 and 38 extend between the headers 10 and 12 to provide rigidity to the system.

Figure 2:
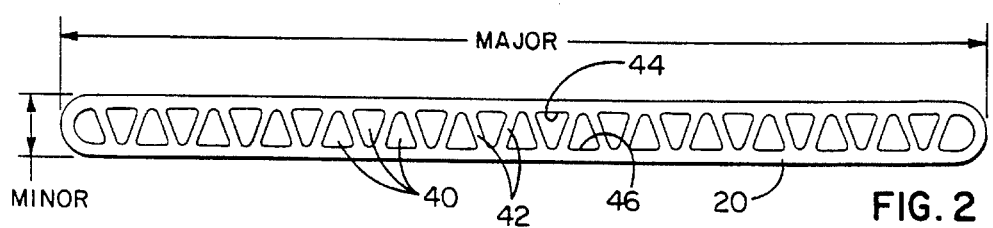
FIG. 2 is an enlarged, sectional view of an extruded, flattened tube employed in the invention.

As seen in FIG. 2, each of the tubes 20 is an extruded flattened tube having a minor dimension and a major dimension. Typically, the minor dimension is made as small as possible since this dimension faces the direction of air flow through the heat exchanger. As a consequence, for a given frontal area of a heat exchanger, an increase in the minor dimension will reduce the air flow area and thus increase pressure drop across the heat exchanger, requiring more energy to pass air through the same. Furthermore, an increase in the minor dimension of the tube 20 will also decrease the area available for air side surface enhancement as is typically provided by fins such as the fins 34.

At the same time, the minor dimension cannot be made too small or else it may result in the internal passage or passages within the tube 20 being so reduced in size as to be overly resistant to the flow of the heat exchange fluid flowing within the tubes.

In a typical case, the minor dimension might be on the order of 1.90 mm.

In the embodiment illustrated in FIG. 2, the major dimension of the tube 20 is slightly greater than an inch at 27.56 mm. This dimension is chosen in connection with the tube minor dimension to provide the desired flow area through each tube. As will become apparent from the following description, some care must be exercised in selecting the tube major dimension so that it is not so large as to result in buckling when a bending force is applied across the tube major dimension. Generally, the tube major dimension will be in the range of about 13 mm to 32 mm.

Within each flattened tube 20 are a plurality of flow passages 40 of generally triangular configuration. The flow passages 40 are separated by integral webs 42 extending between the sides of the tube 20. In the usual case, the interior tube walls 44 and 46 along with the webs 42 will define the passages 40 so they have a relatively small hydraulic diameter. Hydraulic diameter is as conventionally defined, namely, the cross-sectional area of a given flow path multiplied by four and in turn divided by the wetted perimeter of the corresponding flow path. According to the invention, it is preferred that the hydraulic diameter be in the range of about 0.015 to about 0.070 inches (0.381–1.78 mm) and preferably, 0.04 inches (1.02 mm) or less. In the embodiment illustrated, the hydraulic diameter is 0.031 inches (0.79 mm). These hydraulic diameters provide for high efficiency operation as a condenser independent of the orientation of the tubes 20 by eliminating the effect of gravity as more fully pointed out in commonly assigned U.S. Pat. No. 4,998,580 to Guntly, et al., the details of which are herein incorporated by reference.

The webs 42 provide a number of functions. In addition to serving with the inner walls 44 and 46 of each tube 20 to define the individual and discrete flow paths 40 that extend from one end of the tubes 20 to the other, they serve to strengthen the tubes 20 against buckling of one side wall toward or away from the other when a bending force is applied across the tube major dimension.

They also serve to prevent rupture of the tubes 20 when subjected to relatively high internal pressures. Finally, in heat transfer itself, heat may flow to or from the webs 42 from or to the side walls of the tubes 20. The fluid within the tubes 20 will, of course, be in contact with the webs 42 and thus in heat exchange relation therewith. Thus, that part of the fluid within the tubes 20 not in contact with the surfaces 44 and 46, but in contact with the webs 42 is still subject to good heat transfer to or from the corresponding tube 20 itself via the webs 42.

Of course, when the heat exchanger is being used as an evaporator, the flow of heat will be from the fins 34 to the tubes 20 to the refrigerant flowing within the passages 40. If the heat exchanger is used as an evaporator/condenser in a heat pump system, when used as an evaporator, heat flow will be as just mentioned. However, when used as a condenser in a heat pump system, heat flow will be from the refrigerant contained within the passages 40 to the tube 20 and then to the serpentine fins 34 (FIG. 1).

Figure 3:
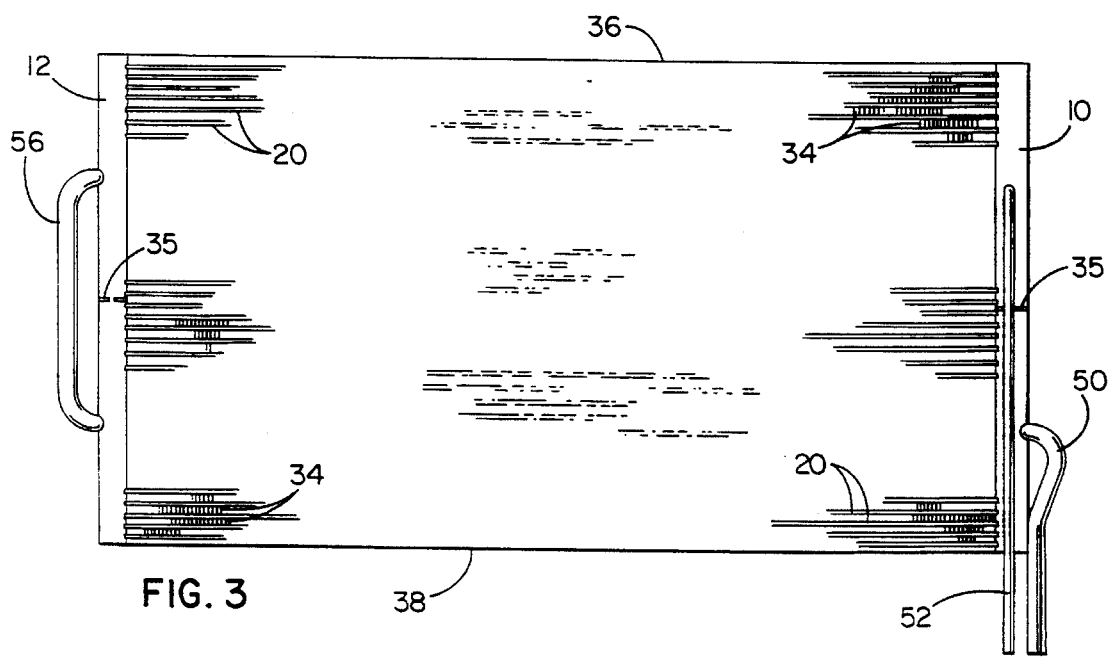
FIG. 3 is a plan view of an evaporator or evaporator/condenser made according to the invention prior to complete formation.

Turning now to FIGS. 3 and 4, scale showings of an evaporator or evaporator/condenser made according to the invention are illustrated. It will be appreciated that the length of the tubes 20 as illustrated in FIG. 3 is much greater than that illustrated in FIG. 1 and this is in accordance with the invention. The purpose of the increased length is to allow a planar heat exchanger like that illustrated in FIG. 1 to be bent intermediate its ends to form a U or a V-shaped configuration having two spaced legs, each in turn having a size roughly equal to the heat exchanger illustrated in FIG. 1, although obviously this will vary dependent upon the particular system in which the heat exchanger is to be included.

In any event, in FIG. 3, like reference numerals are utilized to illustrate like parts. It will be seen that a baffle 35 is disposed within the header 10 at the approximate midpoint thereof. As a consequence, the number of tubes 20 on each side of the baffle 35 will be substantially the same. Where all tubes 20 are identical, the baffle 35 in the header 10 creates two passes of substantially equal cross-section or flow area. Through the use of additional baffles 35, additional passes may be created if desired. A relatively large diameter tube 50, is in fluid communication with that part of the header 10 below the baffle 35 and serves as a vapor outlet tube when the heat exchanger is operating as an evaporator or as a vapor inlet tube when the heat exchanger is being used as a condenser in a heat pump system.

A smaller diameter, liquid inlet/outlet tube 52 is in fluid communication with the interior to the header 10 on the upper side of the baffle 35.

Figure 7:
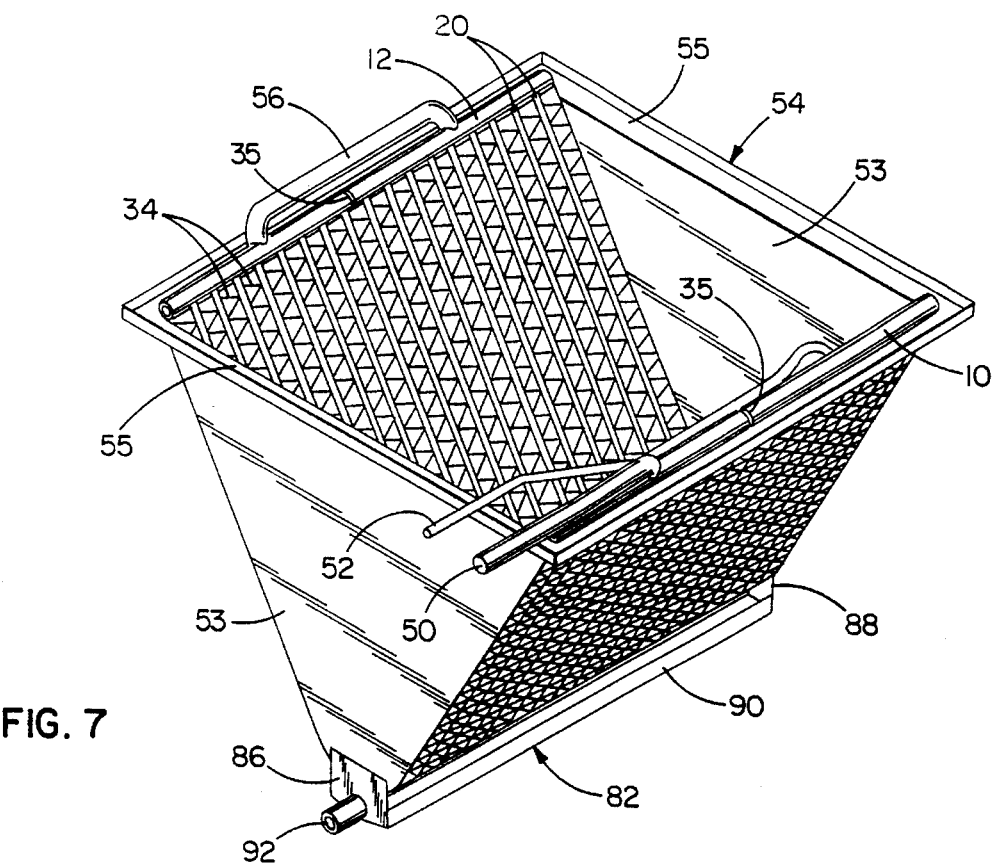
FIG. 7 is a perspective view of the finished evaporator/condenser.

In many instances the sides of the evaporator are closed off by V or U-shaped imperforate side panels 53 (FIGS. 6 and 7) mounted to the side pieces 36 and 38. The imperforate side panels 53 prevent air from flowing from one side of the core to the other around the side pieces 36, 38 without passing through the fins 34.

At the upper sides of the side panels 53 as well as at the headers 10, 12 a peripheral mounting flange 54 is located. The flange 54 has a flat horizontal peripheral seat 55 which is adapted to rest on and be sealed to an appropriate seat within a plenum of a furnace, air handler or heat pump with which the evaporator/condenser is to be used. Thus, the side panel and the seat 55 serve to force air flow through the core and prevent bypassing of the same.

The header 12 is desirably provided with a jumper tube 56 which interconnects those sections of the header 12 on opposite sides of the baffle 35 in that header, but which is not absolutely required and may be omitted along with the baffle 35 in some instances.

It will be noted from FIG. 3 that the tubes 50, 52 and 56 all connect into the approximate center of the section of the header 10 or 12 with which they are associated. This feature of the invention is most important when the heat exchanger is operating as an evaporator since it provides good distribution of the refrigerant throughout the evaporator to minimize temperature differentials from one part of the heat exchanger face to another.

Turning now to FIG. 4, the side piece 38, at its approximately midpoint is provided with an accordion formation, generally designated 60. The side piece 36 is similarly provided with such an accordion formation (not shown) at the same location.

Each accordion formation is defined by a series of slots or notches. As seen in FIG. 4, one edge 62 of the side piece 38 is provided with a series of slots or notches 64 that extend transversely to the direction of elongation of the side piece and toward the opposite edge 66, but not completely thereto. Similarly, the edge 66 is provided with a series of slightly longer slots or notches 68 which extend toward the edge 62. The slots 64 have a depth of approximately two-thirds the depth of the slots 68 and a continuous center area 70 extending along the length of the side piece 38 between the bottoms of the slots 64 and 68 may have a width that is approximately the same as the depths of the slots 64 or possibly slightly less.

The heat exchanger as shown in FIGS. 3 and 4 is assembled generally according to the process disclosed in commonly assigned U.S. Pat. No. 4,688,311 to Saperstein, the details of which are herein incorporated by reference. Its structure at this point in its manufacture is, other than length of the tubes 20, essentially as disclosed in commonly assigned U.S. Pat. No. 4,998,580 previously identified. However, it is preferred to use extruded tubes such as that illustrated in FIG. 2 herein to tubes provided with spacers or inserts as specifically disclosed in U.S. Pat. No. 4,688,311 or U.S. Pat. No. 4,998,580. Where the latter are used, they will be fabricated of braze clad aluminum, and the fins 34 need not be braze clad in this case.

Figure 9:
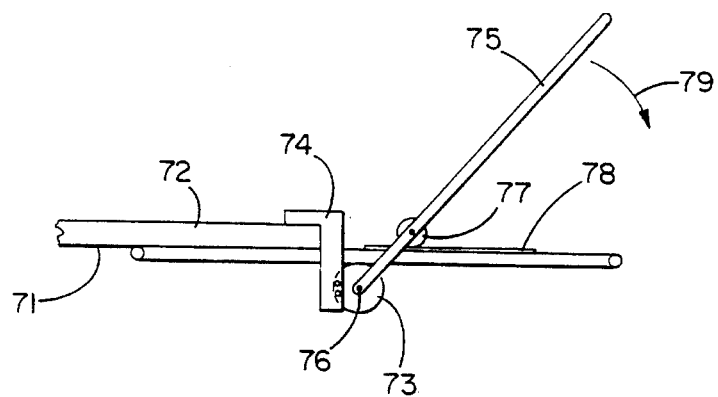
FIG. 9 is a schematic of a core folding apparatus.

It will be appreciated that the heat exchanger illustrated in FIGS. 3 and 4 is, of course, planar. According to the invention, it is desired that the heat exchanger be made into a U or V-shaped configuration such as illustrated in FIG. 5. To this end, the heat exchanger of FIGS. 3 and 4 is bent to the configuration shown in FIG. 5. The bend occurs in the area of the accordion formations 60. The bend may be formed with an apparatus like that shown in FIG. 9. The heat exchanger in a planar form as in FIGS. 3 and 4 has one end abutted to the underside 71 of a bench 72 and extends such that its midpoint with the accordion formations 60 is disposed on a fixed, cylindrical mandrel 73 mounted to the bench by inverted L-shaped arms 74. The mandrel 73 will typically have a diameter of 4 inches or more.

A handle 75 is pivoted to the mandrel 73 at its cylindrical axis and, intermediate its ends, carries a roller 77. A plate 78 may be loosely disposed on the upper surface of that part of the heat exchanger extending past the mandrel and in turn is engaged by the roller 77. By swinging the handle 75 in the direction of an arrow 79, the requisite bending force is uniformly applied through the plate 78 until the configuration shown in FIG. 5 is obtained.

This bending force is, of course, being applied across the major dimension of the tubes 20, but the same, being aluminum extrusions, readily deform without buckling. Tubes having individual inserts as described in the previously identified U.S. Pat. No. 4,688,311 may also be utilized in lieu of extrusions, but for a comparable major dimension the same have a greater tendency to buckle during the bending process. The accordion formations 60 allow the side pieces 36 and 38 to bend without appreciable buckling.

In any event, the bend results in the formation of an apex 80 at the approximate midpoint of the accordion formation 60. The apex 80 is below the plane defined by the headers 10 and 12. To this apex 80, a condensate trough, (FIGS. 6–8) generally designated 82, is attached as by screws 84 extending into the side panels and possibly the side pieces 36 and 38 as well. The trough 82 is formed of end pieces 86 and 88 and a connecting U-shaped, upwardly opening bottom and side wall piece 90. The endwall 86 or the endwall 88, or both, may be provided with one or more condensate outlet fittings 92.

Figure 8:
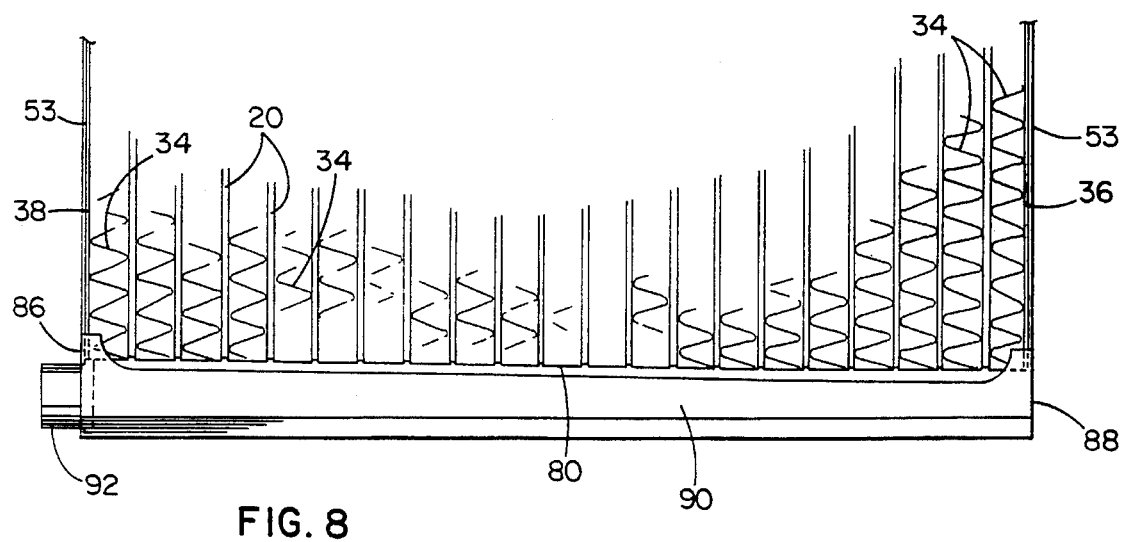
FIG. 8 is a fragmentary, elevational view of the evaporator or evaporator/condenser taken from the right of FIG. 6.

As can be appreciated from FIG. 8, the minor dimensions of the tubes 20 are all exposed and free from the serpentine fins 34 which extend along only major dimensions of the tubes between adjacent tubes or, at the sides of the resulting core, between a tube 20 and one of the side pieces 36 and 38. As a consequence, condensate forming on the fins 34 or tubes 20 and flowing to one of the tubes 20 is free to run down the same in the space between adjacent fins 34 until the apex 80 is reached. Some of the condensate will also pass through the customary louvers in the fins 34 and descend to the apex 80. As the condensate builds up at the apex 80, droplets of sufficient size to overcome the surface tension forces attaching the condensate to the apex 80 will be created and the condensate will then drop free into the condensate collection trough 82.

Through the use of a U or a V-shaped configuration, a single condensate collection trough such as the trough 82 is advantageously employed in contrast to the requirement for two separate collection areas or troughs found in typical A-coil evaporator installations.

Figure 10:
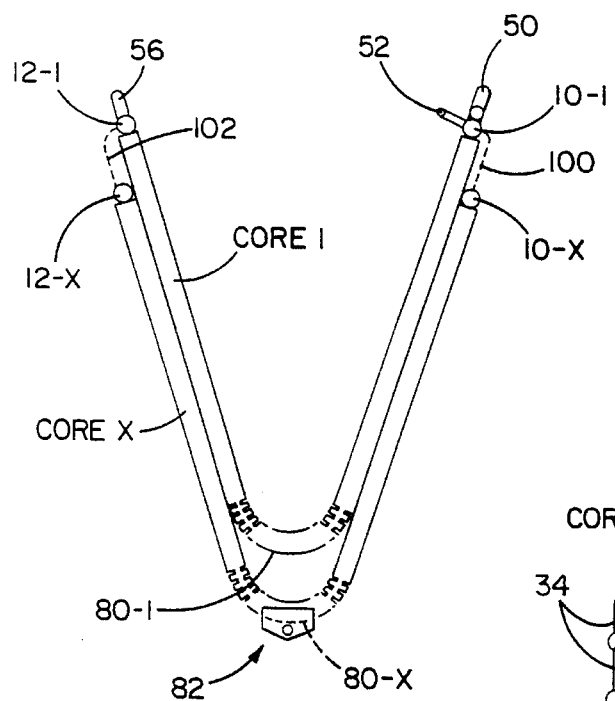
FIG. 10 is a view similar to FIG. 5, but of a multiple tube row embodiment of the invention.

The invention also contemplates the provision of a multiple tube row evaporator or evaporator/condenser. A two tube row evaporator or evaporator/condenser is illustrated in FIG. 10. Basically, two or more of the cores without the trough 82 as illustrated in FIG. 5, and with appropriate parts of the inlet, outlets and other connecting tubing omitted, are simply nested as illustrated in FIG. 10. As illustrated, the uppermost core is labeled "core 1" while the lowermost core is labeled "core X" where X is an integer equal to the total number of cores in the multiple tube row evaporator or evaporator/condenser.

Conduits shown schematically at 100 and 102 interconnect the headers 10 and 12 in any desired flow path arrangement and the apex 80 of the first core is vertically aligned with and above the apex 80 of the lowermost core shown at 80-X in FIG. 10. One of the condensate troughs 82 is connected to the lowermost core, core-X, at its apex 80-X in the same fashion described previously in connection with FIGS. 6–8. The side panels may be enlarged to span the distance between cores and then be joined to each core in the stack by screws. Additionally, the conduit connections 100 and 102 as well as the relative interference occurring as a result of the nesting of the cores are employed to secure the same together.

The inlet and outlet tubes 50 and 52 may be associated with the first core, core 1, as illustrated in FIG. 10 or any other cores as desired.

It will be readily appreciated that in an upflow furnace, air moving through the assemblage of FIG. 10 will pass through the tubes and fins of each of the cores, core 1 through core X, beginning with the lowermost core, core X. For a downflow furnace, flow will be in the opposite direction.

Figure 11:
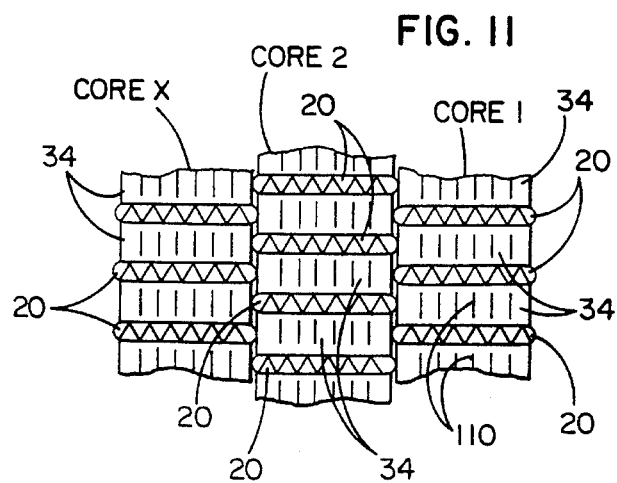
FIG. 11 is an enlarged, fragmentary sectional view of one tube alignment of a multiple tube row embodiment of the invention.

FIG. 11 shows one embodiment of a multiple tube row evaporator or evaporator/condenser made according to the invention, specifically a three tube row evaporator or evaporator/condenser. The serpentine fins are shown at 34 and are seen to include enhancements such as conventional louvers 110. The flattened tubes are again shown at 20 and it will be observed that the tubes 20 in adjacent cores are staggered. Such an arrangement can be achieved by appropriately locating the slots 14 (FIG. 1) in the headers 10 and 12 using one set of locations for core 1 and core X as viewed in FIG. 11 and another set of locations for core 2. Alternatively, identical cores could be used with one shifted slightly with respect to another in the nesting process so as to achieve the desired stagger.

Figure 12:
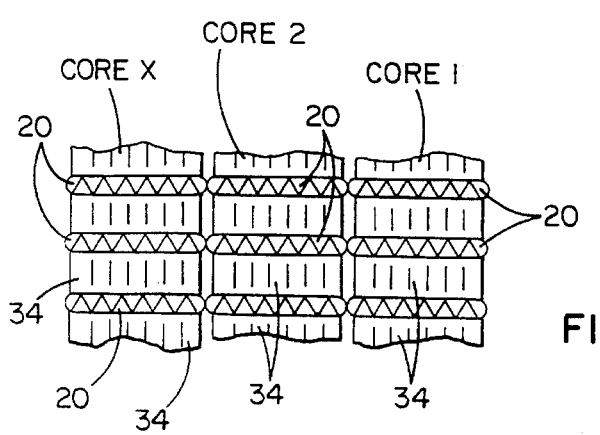
FIG. 12 is a view similar to FIG. 11, but of another embodiment of the invention.

Alternatively, the tubes 20 on adjacent cores may be aligned and such an arrangement is illustrated in FIG. 12.

From the foregoing, it will be seen that an evaporator or evaporator/condenser made according to the invention can be constructed with a great deal of flexibility, allowing the same to be readily customized for any given installation or system. Multiple passes are easily achieved through the use of baffles while multiple tube row configurations are easily achieved by nesting several single row evaporator or evaporator/condenser constructions.

While each tube has two joints, one at each end to the adjacent header, which are potential leakage sites, in some instances, the number of tubes is substantially reduced from the number of tubes employed in conventional plate fin round tube A-coil constructions thereby reducing leakage potential. Significantly, an evaporator or evaporator/condenser made according to the invention generally reduces the necessary refrigerant charge in a typical system in the range of 10–15 percent over an otherwise equivalent conventional system. Reduction in refrigerant charge, particularly where the refrigerant is a CFC or HCFC is highly desirable in that it reduces potential leakage of possibly polluting or otherwise damaging refrigerants into the environment.

The relatively long length of the tubes 20 of the structure illustrated in FIG. 5, for example, as contrasted to the similar heat exchanger as illustrated in FIG. 1, tends to create sufficient resistance to refrigerant flow that the problems of distribution of refrigerant in an evaporator are reduced. And when the various fluid connections are generally as illustrated in FIG. 3 in relation to baffles or the like, distribution problems are rendered relatively insignificant.

In the cooling mode, water vapor often condenses onto the fins and tubes, thereby increasing resistance to air flow. No such condensation takes place in the heating mode. As a result, the air side pressure drop in the cooling mode is always greater than or equal to the air side pressure drop in the heating mode. The difference between the cooling mode and heating mode air side pressure drops is a measure of an evaporator/condenser's ability to drain condensate: The smaller the difference, the better the drainage. In a conventional plate fin round tube evaporator/condenser of a particular size, the heating mode air pressure drop was determined to be 0.14 inches of water, while in the cooing mode the air pressure drop across the same was 0.20 inches of water. In a similar capacity evaporator/condenser made according to the invention, the heating mode air pressure drop was 0.14 inches of water, while the cooling mode air pressure drop was 0.15 inches of water. This smaller difference in air pressure drop between the heating and cooling modes indicates, at the very least, better drainage of condensate in the evaporator/condenser of the invention over the conventional plate fin round tube evaporator/condenser which, of course, is an advantage for the reasons previously stated.

An evaporator or evaporator/condenser made according to the invention weighs only about one-half as much as a conventional plate fin round tube evaporator of identical heat exchange capacity, thereby providing a weight advantage which is of substantial assistance during an installation procedure.

Furthermore, many of the manual operations associated with the manufacture of plate fin round tube evaporators are eliminated, thereby simplifying manufacture. Additionally, much of the equipment employed in manufacturing an evaporator or evaporator/condenser made according to the invention may be advantageously employed in manufacturing other heat exchangers such as that illustrated in FIG. 1 which is useful as a condenser or as an oil cooler. Thus, capital requirements can be reduced.

Finally, and significantly, the heat exchanger of the present invention can perform two different heat exchange operations with a great deal of efficiency, namely, evaporation and condensation. Thus, the same is ideally suited for incorporation into heat pump systems to improve the efficiency thereof.

We claim:

1. A method of making an evaporator or evaporator/condenser comprising the steps of:
   a) assembling parallel flattened tubes with internal webs extending between the interior of the side walls of the flattened tubes to spaced parallel headers with serpentine fins between the tubes;
   b) subjecting the assemblage resulting from step a) to a bonding process to unite said headers, said tubes and said fins into a unitary assembly; and
   c) thereafter bending the unitary assembly between said headers into a U or V-shaped configuration.

2. The method of claim 1 wherein said fins, said tubes and said headers are aluminum and said bonding process is a brazing process.

3. The method of claim 1 wherein step c) is followed by the step of attaching a condensate collecting trough to said unitary assembly so as to be aligned therewith.

4. The method of claim 1 wherein steps a), b) and c) are repeated to provide at least two U or V-shaped configurations and are followed by:
   d) nesting said U or V-shaped configurations in a stack to provide a multiple row evaporator or evaporator/condenser.

5. The method of claim 4 further including the step of e) attaching a trough to the evaporator or evaporator/condenser below the lowermost U or V-shaped configuration in alignment with the bottom thereof and opening toward the U or V-shaped configuration.

6. The method of claim 4 wherein step d) includes aligning the tubes in adjacent U or V-shaped configuration.

7. The method of claim 4 wherein step d) includes staggering the tubes in adjacent U or V-shaped configurations.

8. The method of claim 1 further including the step of forming a baffle in one of said headers intermediate the ends thereof to thereby provide a multiple pass evaporator or evaporator/condenser.

9. A method of making an evaporator or evaporator/condenser comprising the steps of:
   a) assembling parallel flattened tubes to spaced parallel headers with serpentine fins between the tubes;
   b) bonding the headers, tubes and fins into a unitary, generally planar assembly having opposed ends and spaced sides interconnecting said ends;
   c) locating a point on the assembly between said ends in adjacency to a mandrel having a curved surface that extends between said spaced sides;
   d) restraining one of said ends; and
   e) applying a force against said assembly at points successively moving away from said location toward the other of said ends and in sufficient amount to bend said assembly into a U or V-shaped configuration.

10. The method of claim 9 wherein step e) is performed with a roller.

11. The method of claim 9 wherein step e) is preceded by placing a plate on said assembly between said location and said other end and step e) is performed by applying said force against said plate with the use of a roller.

12. The method of claim 11 wherein said roller is carried by a lever arm pivoted for rotation about an axis passing close to or through said mandrel.

13. The method of claim 12 wherein said curved surface is cylindrical and said axis is the cylindrical axis of said surface.

14. The method of claim 9 wherein step d) is performed by abutting said one end against an object that is fixed with respect to said mandrel.

15. The method of claim 14 wherein said mandrel is mounted on said object.

16. The method of claim 15 wherein step e) is preceded by placing a plate on said assembly between said location and said other end and step e) is performed by applying said force against said plate with the use of a roller.

17. The method of claim 16 wherein said roller is carried by a lever arm pivoted for rotation about an axis passing close to or through said mandrel.

18. The method of claim 17 wherein said curved surface is cylindrical and said axis is the cylindrical axis of said surface.

* * * * *

(12) EX PARTE REEXAMINATION CERTIFICATE (9759th)
United States Patent
Hughes et al.

(10) Number: US 5,533,259 C1
(45) Certificate Issued: Jul. 18, 2013

(54) METHOD OF MAKING AN EVAPORATOR OR EVAPORATOR/CONDENSER

(75) Inventors: Gregory G. Hughes, Milwaukee, WI (US); Leon A. Guntly, Racine, WI (US); John B. Welker, Granger, IN (US); David T. Hill, Racine, WI (US); Jerome P. Henkes, Racine, WI (US); Michael J. Reinke, Franklin, WI (US); C. James Rogers, Racine, WI (US)

(73) Assignee: JPMorgan Chase Bank, N.A., New York, NY (US)

Reexamination Request:
No. 90/012,294, May 14, 2012

Reexamination Certificate for:
Patent No.: 5,533,259
Issued: Jul. 9, 1996
Appl. No.: 08/131,665
Filed: Oct. 5, 1993

Related U.S. Application Data

(60) Division of application No. 07/850,338, filed on Mar. 11, 1992, now Pat. No. 5,279,360, which is a continuation-in-part of application No. 07/620,729, filed on Dec. 3, 1990, now abandoned, which is a division of application No. 07/141,628, filed on Jan. 7, 1988, now Pat. No. 4,998,580, which is a continuation-in-part of application No. 06/902,697, filed on Sep. 5, 1986, now abandoned, which is a continuation-in-part of application No. 06/783,087, filed on Oct. 2, 1985, now abandoned.

(51) Int. Cl.
| | |
|---|---|
| F28F 1/02 | (2006.01) |
| F28F 3/02 | (2006.01) |
| F28F 9/02 | (2006.01) |
| F25B 39/02 | (2006.01) |
| F25B 39/04 | (2006.01) |
| B23P 15/26 | (2006.01) |

(52) U.S. Cl.
USPC .............. 29/890.043; 29/890.046; 29/890.07

(58) Field of Classification Search
None
See application file for complete search history.

(56) References Cited

To view the complete listing of prior art documents cited during the proceeding for Reexamination Control Number 90/012,294, please refer to the USPTO's public Patent Application Information Retrieval (PAIR) system under the Display References tab.

*Primary Examiner* — Peter C. English

(57) ABSTRACT

An improved evaporator or evaporator/condenser for use in refrigeration or heat pump systems including first and second spaced, pressure resistant headers (10, 12); a plurality of elongated tubes (20) of flattened cross-section extending in parallel, spaced relation between and in fluid communication with the headers (10, 12) and serpentine fins (34) extending between and bonded to adjacent ones of the tubes (20). The tubes (20) and fins (34), between the headers (10, 12), define a non-planar configuration having an apex (80). A condensate trough (82) is aligned with and opens towards the apex (80) to receive condensate dripping therefrom.

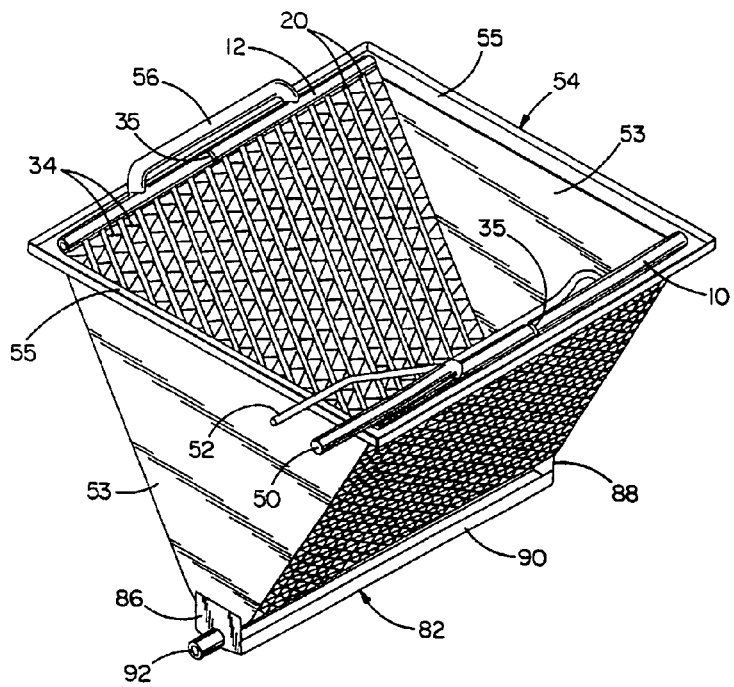

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-8 are cancelled.

Claims 9-18 were not reexamined.

\* \* \* \* \*